3,278,639
PROCESS FOR GRAFTING UNSATURATED
MONOMERS ONTO POLYAMIDES
Otto Jack Matray, Wilmington, Del., assignor to E. I. du
Pont de Nemours and Company, Wilmington, Del., a
corporation of Delaware
No Drawing. Filed Mar. 18, 1963, Ser. No. 266,043
9 Claims. (Cl. 260—857)

This application is a continuation-in-part of application Serial No. 785,793, filed January 9, 1959, now abandoned.

This invention relates to a chemical process. More particularly it relates to a process for modifying particular properties of a synthetic condensation polymer.

The physical properties of a structure formed from a synthetic condensation polymer such as the dyeability, hydrophily, light durability, heat resistance, density and the like of a synthetic textile (i.e., a filament, fiber, staple, floc, yarn, tow, cord, fabric, or the like) are largely determined by the nature of the polymer from which the structure is prepared. Because of this identity of physical properties and chemical natures, the choice of a particular polymer for a particular end use has in the past been a matter of balancing desirable versus non-desirable properties in any particular polymer. The process of the present invention is directed to the modification of the chemical nature of any particular condensation polymer only to the extent necessary to impart a physical or chemical property previously lacking without substantially affecting the gross properties of the original condensation polymer.

It is an object of the present invention to provide a process for modifying a synthetic condensation polymer without substantially disturbing the gross properties of the said condensation polymer.

Another object is to provide a process for the preparation of graft copolymers formed from synthetic, linear condensation polymers of fiber-forming molecular weight.

These and other objects will become apparent in the course of the following specification and claims.

In accordance with the present invention a process for preparing a grafted synthetic, linear condensation polymer is provided which comprises contacting the melt of (a) the said synthetic, linear condensation polymer and the melt of (b) a modifier compound of the formula $$CX_2=CX_2$$

wherein X is a member of the class consisting of hydrogen, organic radical and inorganic radical with the proviso that at least one X is other than hydrogen, the said contact of melts resulting in the graft, to carbon forming an inegral part of the polymer chain of the linear condensation polymer, of a radical of the formula $$-CX_2 \cdot CX_2 \cdot (CX_2 \cdot CX_2)_n-X$$

wherein X is as defined above and $n$ is a number from zero to a large value. By "a synthetic, condensation polymer" is intended a polymer produced by the step-wise intermolecular condensation of functional groups as well as those polymers produced synthetically which on chemical degradation (e.g. by hydrolysis) yield monomeric end products differing in composition from the structural units. (J. P. Flory, "Principles of Polymer Chemistry," page 40, Cornell University Press, Ithaca, New York.) Such a polymer is of "fiber-forming molecular weight" when a fiber is formed upon touching a glass rod to the molten surface of the said polymer and pulling it away. Typical condensation polymers include polyamides, polyureas, polyesters, polyurethanes, polythioesters, polysulfonamides, and the like.

In the following examples the conversion of modifier to unextractable graft copolymer is measured by treating a dried and finely divided or filamentary sample of the raw product from the melt grafting process with a suitable extractant for the modifier in a Soxhlet extractor. The extract is discarded. The residue is dried in a nitrogen atmosphere of reduced pressure at 120° C. to constant weight. From the weight of the sample before and after extraction is calculated the conversion (percent) of the modifier to unextractable polymer. In the analysis by preciptation reported in the examples, a dried and weighed sample of the extracted product of the above analysis is dissolved in a suitable solvent. A precipitant for the backbone polymer which is a solvent for the ungrafted modifier is added dropwise to the filtrate under vigorous stirring until no more precipitate is formed. The preciptate is filtered off, rinsed with precipitant and dried to constant weight at 120° C. in a nitrogen atmosphere of reduced pressure. From this weight and the weight of the sample of extracted copolymer is calculated the content of modifier in the copolymer. From this weight and the weight of the raw copolymer is calculated the conversion of modifier to copolymer. The values are corrected for the solubility of the substrate in the mixture of solvent and precipitant determined by controls.

The examples are cited to illustrate the invention. They are not intended to limit it in any manner. The technique employed in the examples reported in Table I is similar to that of Example 1 except that in Examples 2 and 4 to 7 inclusive a blending period of 30 minutes is used and in Examples 2 and 3 ungrafted excess modifier is extracted from the final shaped (filamentary) structures instead of from the polymer prior to shaping.

EXAMPLE 1

50 grams of sifted (through an 80-mesh sieve, hole size 0.0070 inch) bright (0.02% $TiO_2$) polyhexamethylene adipamide flake of 39 relative viscosity and 25 grams commercial N-vinyl pyrrolidone are mixed at 25° C. in a polymer tube. The polymer tube is provided with a spiral stirrer and with a heating bath containing dimethyl phthalate having a boiling point 282° C. The polymer tube is closed air tight and purged thoroughly with nitrogent by ten times evacuating and refilling with nitrogen. The heating bath is gradually brought to 282° C. and stirring started as soon as possible. It is observed that the contents of the tube are molten at about 230° C. The polymer tube is kept in the heating bath at 282° C. under continuous stirring for 60 minutes, after the contents of the tube have been melted. The heating bath is then removed and the copolymer cooled in the tube under nitrogen. After cooling, the 75 grams of reaction product are removed and ground to powder in an Osterizer.

65.1 grams of the powder are extracted in a Soxhlet with water of 100° C. for 24 hours and then dried to a constant weight in a nitrogen atmosphere of reduced pressure at 120° C. The weight of the product is 57.5 grams. From these weights it is calculated that the graft copolymer contains 24.5% unextractable poly-N-vinyl pyrrolidone and that the yield of the commercial N-vinyl pyrrolidone to unextractable copolymer is 65%.

The so-prepared graft copolymer is melt spun at 277° C. from a screw extruder (½ inch diameter) at a spinning speed of 100 yards per minute into a five filament yarn bundle, which is drawn, at 80° C. pin temperature and 120° C. plate temperature, and at a draw ratio of 4.0, to a 23.5 total denier yarn bundle.

The yarn is readily and deeply dyeable with acid dyes, vat dyes, direct dyes, milling dyes and "Capracyl" dyes and shows the hydrophilic characteristics of increased moisture regain, increased wickability, improved crease recovery, permanent creasing by steam setting, and easy removal of oily soil as compared to a control containing no grafted modifier, and shows further high tensile strength retention after bleaching and high light durability when compared with the same control.

Table I below identifies the amounts of condensation polymer (all polyhexamethylene adipamide except Example 9 which is polycaproamide and Example 10 which is the polyamide of p-xylylenediamine and azelaic acid) and the types and amounts of modifier which are melted together.

Table I

| Example | Polymer (grams) | (Grams) Modifier |
| --- | --- | --- |
| 1 | 50 | 25 N-vinylpyrrolidone. |
| 2 | 40 | 20 N-vinyl carbazole. |
| 3 | 50 | 25 α-vinyl naphthalene. |
| 4 [1] | 50 | 10 pentamethyl disiloxane methylmethacrylate. |
| 5 [1] | 28 | 7 1,1,11-trihydroperfluoroundecylacrylate. |
| 6 [2] | 45 | 14.5 lauryl methacrylate. |
| 7 | 50 | 25 vinyl stearate. |
| 8 | 50 | 25 N-vinylpyrrolidone. |
| 9 | 50 | 25 N-vinylpyrrolidone. |

[1] Swells in water, length increases.
[2] Coef. of friction lowered.

Table II below indicates the extractants, solvents and precipitants employed in determinations of the percentage modifier (Mod.) in the grafted copolymer (G.C.P.) and the percentage conversion of modifier to grafted copolymer by the extraction analytical technique (A) and the extraction, solution and precipitation analytical technique (B).

Table II

| Exam. | Extractant | Solvent | Precipitant | Percent Mod. G.C.P. (A) | Percent Mod. G.C.P. (B) | Percent Conversion (A) | Percent Conversion (B) |
| --- | --- | --- | --- | --- | --- | --- | --- |
| 1 | Water | Formic acid | Water | 24.5 | 17 | 65 | 40 |
| 2 | Methanol | Benzyl alcohol | Xylene | 20 | 15 | 50 | 38 |
| 3 | Tetrahydrofuran | do | do | 15.1 | 8 | 36 | 19 |
| 4 | Benzene | | | 17 | | 100 | |
| 5 | Tetrahydrofuran | | | 18 | | 86 | |
| 6 | Butyl acetate | | | 16 | | 58 | |
| 7 | do | | | 9.1 | | 18.4 | |
| 8 | Water | Formic acid | Water | 23 | 12 | 60 | 26 |
| 9 | do | do | do | 24 | 20 | 63 | 51 |

In each of the above "precipitation" determinations reported in Table II, a correction for the solubility of the substrate in the mixture of solvent and precipitant is made as shown in Table III.

Table III

Examples:     Correction (percent)
1 ---------------------------------- 3.2
2,3 -------------------------------- 6.7
8 ---------------------------------- 3.6
9 ---------------------------------- 4.6

A filament is prepared from each of the grafted copolymers following the technique of Example 1 except for the spinning temperature and draw ratios. These are reported in Table IV together with observed differences in properties between the structure of the grafted copolymer and those of a control made from the corresponding ungrafted condensation polymer.

Table IV

| Ex. | Spinning Temp., °C. | Draw Ratio | Observed Property Differences |
| --- | --- | --- | --- |
| 1 | 276 | 3.7 | (See Example 1). |
| 2 | 266 | 4.0 | Increased resistance to deterioration by heat. Decrease in electrical conductivity. |
| 3 | 287 | 3.7 | More easily dyed, increased wickability; increased covering power; decrease in luster; decrease in density. |
| 4 | 317 | 4.0 | Decrease in coefficient of friction; faster wet crease recovery; more readily swellable in water; increase in lubricity. |
| 5 | 283 | 2.3 | (Same as 4). |
| 6 | 283 | 3.8 | (Same as 4). |
| 7 | 260 | 3.7 | |
| 8 | 260 | 3.7 | (Same as 1). |
| 9 | 295 | 3.7 | (Same as 1). |

Properties which can be so modified by the introduction of functional groups are for example Coloration (dyeability)
Hydrophily (moisture regain, wickability, wet crease recovery, permanent creasing by heat setting, ease of removal of oily soil)
Oxidative stability (tensile strength retention after bleaching)
Light durability
Heat resistance
Reduced conductivity
Luster (delustered by voids)
Density (lower due to voids)
Coefficient of friction (increased lubricity)
Swelling in water Functional groups which can be introduced to effect one or more of these property variations include those containing nitrogen, oxygen, sulfur, halogen, silica, phosphorus, aromatic rings, etc. Among the suitable materials are amides such as N-methyl-N-vinyl formamide, N-vinyl pyrrolidone, methyl substituted N-vinyl pyrrolidone, vinyl oxyethylformamide; acrylate esters such as methyl acrylate, ethyl acrylate, benzyl acrylate, octyl acrylate, methyl methacrylate, butyl methacrylate, N,N-diethylaminoethyl methacrylate; vinylic alcohols such as 3-hydroxycylopentene; vinyl amines such as vinyl pyridine, vinyloxyethylamine, 3,3 - dimethyl - 4 - dimethylamino-1-butene; vinyl esters such as vinyl acetate, vinyl salicate, vinyl stearate; vinyl ethers such as vinyl 2-chloroethyl ether, methoxy polyethyleneoxymethacrylate; halides such as vinyl fluoride, tetrachloroethylene, tetrafluoroethylene, 1,1-dichloro - 2,2 - difluoroethylene, hexachloropropene, 2-bromoethyl acrylate, vinyl tetrafluoropropionate, 1,1,7-trihydroperfluoroacrylate; vinyl ketones such as methyl vinyl ketone, ethyl vinyl ketone; cyanides such as methacrylyl cyanide, 2-nitro-1-butene; phosphorous containing vinyls such as diethyl vinyl phosphate, diphenyl vinyl phosphine oxid, bischloroethyl vinyl phosphonate; also included are alkyl, aryl, aralkyl phosphonates, phosphites and phosphinates; sulfur containing vinyls including sulfonates, sufonamides, thiocarboxylates, esters of the sulfonic acids. It will be noted that all the materials named above as suitable modifiers are monoethylenically unsaturated, monomeric compounds.

In any of the aforegoing examples, the temperature at which the substrate and modifier are first brought together may be any temperature below the blending temperature. In a batch process it may conveniently be room temperature. In a continuous process wherein melt grafting follows the melt polymerization of the polymer substrate, it may be the temperature of the stream of freshly prepared molten polymer.

The blending temperature should be at least the temperature whereat the combined substrate and modifier are molten, which usually is the same as the final melting point (the upper limit of the melting range) of the pure polymer substrate or of the pure modifier, whichever is higher. However, in some instances the presence of the one decreases the final melting point of the other. In these instances the final melting point may be lower than the final melting point of either or both the pure substrate and modifier, and the blending temperature should be at least the so decreased final melting point. An instance of this type occurs in Example 1.

The upper limit for the blending temperature is defined only by the heat stability of the reactants in the blend. Temperatures at which the modifier degrades should be avoided. Temperatures at which the polymer substrate degrades seriously (beyond the breaking of C—H bonds) should be avoided. The temperature range just above the defined lower limit is preferred. The upper limit of the preferred tempeature range is defined by the boiling point of the modifier (at the operating pressure).

The melt grafting temperature depends largely on the individual reactants and may be in the range from 110–400° C. In each instance the lower limit is defined by the initial solidification point of the reaction mixture. As with the blending temperature, the upper limit of the preferred temperature range is defined by the heat stability of the reactants and by the boiling point of the modifier at the reaction pressure. The upper limit of the preferred temperature range is further defined by the depolymerization rate of the polymerized modifier and by the occurrence of cross-linking and gellation. The equilibrium between rates of polymerization and depolymerization shifts towards depolymerization at higher temperatures. Above the temperature at which depolymerization begins to predominate, only monomeric modifier and very short chains of polymerized modifier may be grafted to the polymer substrate. The modification ratio obtained at these temperatures is usually low compared to those obtained at lower grafting temperatures, where polymerization prevails over depolymerization.

In melt grafting the time the reactants should be kept at the grafting temperature to complete reaction (so that essentially all modifier added is polymerized and/or grafted) depends largely on the particular reactants and the grafting temperature chosen. The time required to obtain a certain desired modification ratio (at a particular temperature for a particular combination of substrate and modifier) may be determined by running several reactions with different reaction times and plotting the grafting time versus the modification ratio obtained. The modification ratio may be determined by the extraction test described above.

Substrates (backbone polymers) to which this invention is applicable are synethetic linear condensation polymers. Particularly suitable and preferred when a high modification ratio is desired are nitrogenous polymers containing a hydrogen atom in the alpha position relative to the nitrogen. Important in this preferred class are high molecular weight fiber-forming polyamides, also known as nylons. Although applicant does not wish to be bound by an explanation of the operativeness (in obtaining high modification ratios) of the preferred substrates, it is believed that the nitrogen activates the hydrogen in the alpha position relative to it, and makes it readily abstractable and thereby liable to attack by radicals derived from vinyl compounds. Copolymers are included in the group of preferred polymers, provided they contain at least 1.0% by weight of nitrogen atoms in the polymer chain.

In addition to the polyamides, the invention is especially applicable to the crystallizable, linear condensation polyesters. These comprise linear polyesters containing in the polymer chain carbonyloxy linking radicals,

The polymers should be of fiber-forming molecular weight; usually, this implies a relative viscosity of about 10 or higher as conventionally measured in solution in a solvent for the polymers. A good solvent for most of the linear condensation polyesters is a mixture of 58.8 parts of phenol and 41.2 parts of trichlorophenol. Copolyesters, terpolyesters, and the like are intended to be comprehended within the term "polyesters."

EXAMPLE 11

Fifty grams of finely ground (80-mesh) polyethyleneterephethalate of intrinsic viscosity of 0.75 and 25 grams of commercial N-vinyl-2-pyrrolidone are mixed at 25° C. in a 300 ml. round bottom flask fitted with a mechanical stirrer and a side arm leading to a vacuum pump. The vessel is closed and purged with nitrogen by evacuating and refilling with nitrogen five times. The contents of the flask are stirred at 280° for 60 minutes. A nitrogen "blanket" is maintained over the melt during the blending. The melt is allowed to cool under nitrogen to an opaque tan solid. The product is removed and ground to an 80-mesh particle size. The product has a polymer melt temperature of 239° C.

29.49 grams of this powder is extracted in a Soxhlet extractor with water at 100° C. for 41 hours and then dried to constant weight in a vacuum oven. After extraction the product weighs 28.56 grams. From these figures the yield of N-vinyl-2-pyrrolidone to unextractable copolymer is 90%.

EXAMPLE 12

50 grams of finely ground (80-mesh) copolymer of ethylene glycol with 83 percent dimethyl terephthalate and 17% of dimethyl hexahydroterephthalate of intrinsic viscosity of 0.62 and 25 grams of commerial N-vinyl-2-pyrrolidone are mixed at 25° C. in a 300 ml. round bottom flask fitted with a mechanical stirrer and a side arm leading to a vacuum pump. The vessel is closed and purged with nitrogen by evacuating and refilling the nitrogen five times. The contents of the flask are stirred at 280° for 60 minutes. A nitrogen "blanket" is maintained over the melt during the blending. The melt is allowed to cool under nitrogen to an opaque tan solid. The product has a polymer melting temperature of 211° C.

29.43 grams of this powder is extracted in a Soxhlet extractor with water at 100° for 41 hours and then dried to constant weight in a vacuum oven. After extraction the product weighs 28.09 grams. From these figures the yield of N-vinyl-2-pyrrolidone to unextractable copolymer is 86%.

The polymer is preferably cut in small size flake if it is brought together with the modifier at a temperature below its melting point.

The modifiers used in the melt grafting process of this invention are vinyl compounds showing a tendency to spontaneously form free radicals, at elevated temperatures, and containing functional groups other than the ethylenic double bond. Homopolymerizable compounds are particularly suitable. Mixtures of more than one homopolymerizable compound and mixtures of homopolymerizable and copolymerizable compounds may also be employed.

Modifiers soluble in molten polymer substrate are preferred, but modifiers which form emulsions in molten polymer substrate may also be grafted.

While being blended with the polymer substrate the modifier may be in the liquid or gasous state, but a completely molten state is preferred for the grafting stage. The liquid phase is particularly preferred for the modifier when a high modification ratio and a short reaction time are desired. Accordingly, during the blending and melt grafting, the pressure of a gaseous modifier with a critical temperature above the operating temperature is preferably maintained above the vapor pressure of the pure modifier at the blending temperature in order to liquify the modifier.

As mentioned above the melt grafting and melt extrusion can be combined in one operation. In this embodiment of the process it is preferred to adjust the amount of modifier employed to the modification ratio desired, so that the melt grafting can be continued until essentially no monomer remains.

The absence of monomer during the melt extrusion is usually preferred. The absence of monomer in the extrusion melt may be achieved, as mentioned above, by continuing the melt grafting reaction until no monomer remains, in which case the advantage of the one-step grafting-extrusion operation is retained. The absence of monomer during the extrusion may also be achieved by extracting the monomer from the raw melt grafted product prior to the extrusion.

By the process of the present invention new products are obtained due to the high modification ratios which are realized without affecting the spinnability of the product and at the same time the process is a simple one. Also the requirement of melt spinnability of the polymer (absence of substantial gelation) does not set an upper limit to the modification ratio when the process of this invention is used. Non-uniform distribution of the modifier through the substrate is avoided. The period required for the grafting process is relatively short. Further economies are effected by elimination of expensive initiation techniques. When melt grafting is combined with melt extrusion further economies are realized.

The amount of modifier employed to effect substantial property changes will vary depending on the modifier and the effect desired. When using N-vinyl-pyrrolidone on polyhexamethylene adipamide in the preparation of fibers, it has been found that moisture regain at 74° F. at 100% relative humidity is increased from 8% (an untreated control) to 27.4% when 42% of the modifier is grafted to the condensation polymer. At the same relative humidity a graft of 22% modifier increases the moisture regain to 18%. The wickability of the sample containing 42% modifier is good whereas the sample containing only 22% modifier has a fair wickability. Wickability of the untreated control is poor. The sample containing 42% modifier is observed to have a 20% less loss in tenacity after 200 hours exposure in a weatherometer than the untreated control. The 42% modified sample will dye to a dye depth rating of 10 as compared with a dye depth rating of 1.5 for the control when dyed at the boil with a metallized azo-dye (Cibalan Black B.G.L.). The same sample is dyed to a rating 10 times darker than an unmodified control using acid, chrome, vat and the cobalt dye of Example 3 of German Patent 743,155 (1943).

The polymers of the present invention are useful in the formation of molded articles, textiles such as filaments, yarns, fibers and the like; films, coating compositions, and the like. As illustrated in the application they have particular utility in the field of synthetic polymeric textiles.

Many equivalent modifications will be apparent to those skilled in the art from a reading of the above without a departure from the inventive concept.

I claim as my invention:

1. In the process of producing a graft-synthetic copolymer of (a) a synthetic linear condensation polymer substrate and (b) a polymerizable monoethylenically unsaturated, monomeric modifier selected from the group consisting of amides; acrylate esters; vinylic alcohols; vinyl amines, esters, ethers and ketones; cyanides; halides; phosphorous containing vinyls; and sulfur containing vinyls, said synthtic linear condensation polymer being a synthetic linear fiber-forming polycarbonamides containing recurring amide groups as an integral part of the polymer chain, the improvement which consists of heating together a stirrable melt whose reactive components consist exclusively of said substrate and modifier, at a temperature in the range of 110° to 400° C., said temperature being above the initial solidification point of the mixture but below the temperature at which substantial degradation of either reactant occurs, said substrate being subjected to said heating without pre-treatments designed to form thereon free radicals, and said heating of the melt being the only source of energy applied to the reaction mixture.

2. A process as in claim 1, the heating being followed by the step of extracting the reaction mass with a liquid which is a solvent for the modifier, whereby to remove residual unreacted modifier from the reaction mass.

3. The process of claim 1 wherein the said synthetic linear condensation polymer is polyhexamethylene adipamide.

4. The process of claim 1 wherein the said synthetic linear condensation polymer is polycaproamide.

5. The process of claim 1 wherein the polymer is the polyamide of p-xylylene diamine and azelaic acid.

6. The process of claim 1 wherein the modifier is N-vinyl pyrrolidone.

7. The process of claim 1 wherein the modifier is is 4-vinylpyridine.

8. The process of claim 1 wherein the modifier is $\alpha$-vinyl naphthalene.

9. The process of claim 1 wherein th modifier is lauryl methacrylate.

References Cited by the Examiner

UNITED STATES PATENTS

| 1,967,863 | 7/1934 | Collins et al. | 260—873 |
| 2,101,182 | 12/1937 | Kittredge et al. | 260—873 |
| 2,109,968 | 3/1938 | Collins | 260—873 |
| 2,550,650 | 4/1951 | Arnold | 260—857 |
| 2,991,269 | 7/1961 | Nozaki | 260—873 |

FOREIGN PATENTS

| 1,241,564 | 8/1960 | France. |

MURRAY TILLMAN, *Primary Examiner.*

J. C. BLEUTGE, *Assistant Examiner.*